US007577649B2

(12) United States Patent
Wu et al.

(10) Patent No.: US 7,577,649 B2
(45) Date of Patent: Aug. 18, 2009

(54) ENGINE FOR VALIDATING PROPOSED CHANGES TO AN ELECTRONIC ENTITY

(75) Inventors: Yuh-Cherng Wu, San Jose, CA (US); Horatiu-Zeno Simon, Heidelberg (DE); Huiling Gong, Sunnyvale, CA (US)

(73) Assignee: SAP AG, Walldorf (DE)

( * ) Notice: Subject to any disclaimer, the term of this patent is extended or adjusted under 35 U.S.C. 154(b) by 613 days.

(21) Appl. No.: 10/897,827

(22) Filed: Jul. 23, 2004

(65) Prior Publication Data

US 2006/0020639 A1    Jan. 26, 2006

(51) Int. Cl.
G06F 12/00    (2006.01)
(52) U.S. Cl. .............................. 707/5; 707/8; 707/201; 709/204
(58) Field of Classification Search ............... 707/3, 707/5, 8, 201; 709/204
See application file for complete search history.

(56) References Cited

U.S. PATENT DOCUMENTS 5,696,966 A    12/1997  Velarde
6,108,670 A *  8/2000   Weida et al. ................. 707/203
2001/0049688 A1* 12/2001 Fratkina et al. ........... 707/104.1
2002/0059201 A1*  5/2002 Work ............................. 707/3
2003/0037041 A1*  2/2003 Hertz ............................ 707/1
2003/0110221 A1*  6/2003 Berkowitz et al. ........... 709/205
2004/0181544 A1*  9/2004 Anderson .................... 707/102
2004/0187152 A1*  9/2004 Francis et al. ................. 725/58
2005/0114203 A1*  5/2005 Savitsky et al. ............... 705/11
2005/0257244 A1* 11/2005 Joly et al. ...................... 726/1
2006/0009990 A1*  1/2006 McCormick ................... 705/1

* cited by examiner

Primary Examiner—Hosain T Alam
Assistant Examiner—Jieying Tang
(74) Attorney, Agent, or Firm—Mintz, Levin, Cohn, Ferris, Glovsky & Popeo, P.C.

(57) ABSTRACT

One implementation provides a method for analyzing the validity of a proposed change to an electronic entity. The method includes receiving the proposed changes to an electronic entity from an external device, and calculating a validity index based on a set of definable rules. The inputs to the calculation include quantified values that represent either contextual information about the proposed change or information about a user proposing the change, or some combination thereof. After the calculation of the validity index, the method includes deciding, based on the calculated validity index, whether to proceed further in applying the proposed change to the electronic entity.

15 Claims, 6 Drawing Sheets

ENGINE FOR VALIDATING PROPOSED CHANGES TO AN ELECTRONIC ENTITY

TECHNICAL FIELD

This disclosure relates to change validation, and more particularly to determining when a change proposed by an external user is sufficient to trigger an update to a global data repository.

BACKGROUND

In an enterprise system, a host server may communicate with various mobile devices. Mobile devices such as laptop computers, personal digital assistants (PDA's), tablet computers, or cellular telephones may be used to communicate with and access information that is stored on the host server, possibly storing certain parts of that information locally for use while disconnected from the server. In this manner, users of the mobile devices may have access to information downloaded from an enterprise-wide central repository for use in the field.

Although users of mobile devices may have access to view the information stored in a central repository, mobile users have traditionally not been able to make changes to data in the central repository. Because of the potential widespread proliferation of certain pieces of knowledge across many users in many different locations, incorrect changes to data contained in a central repository may have a significant negative impact.

To avoid such a result, knowledge systems may completely disallow any changes to be made to information in the central repository by its mobile users, instead requiring an administrator or other authorized local users to create any changes after verifying that such changes is necessary and proper. Other knowledge systems may address this problem by again disallowing any changes to information in the central repository, but allowing for remote users to create different versions of the information based on the users' views of the correct information.

SUMMARY

Various implementations are provided herein. One implementation provides a method for analyzing the validity of a proposed change to an electronic entity. The method includes receiving the proposed changes to an electronic entity from an external device, and calculating a validity index based on a set of definable rules. The inputs to the calculation include quantified values that represent either contextual information about the proposed change or information about a user proposing the change, or some combination thereof. After the calculation of the validity index, the method includes deciding, based on the calculated validity index, whether to proceed further in applying the proposed change to the electronic entity.

Various implementations may provide certain advantages. For example, a host server may include a change validation engine to ensure that a user's proposed change to an entity within the knowledge system is, in fact, a valid change request. In this respect, the knowledge system is allowed to evolve over time while still maintaining the integrity of the knowledge system.

The details of one or more implementations are set forth in the accompanying drawings and the description below. Other features, objects, and advantages will be apparent from the description and drawings, and from the claims.

DESCRIPTION OF FIGURES

Like reference symbols in the various figures indicate like elements.

DETAILED DESCRIPTION

Figure 1:
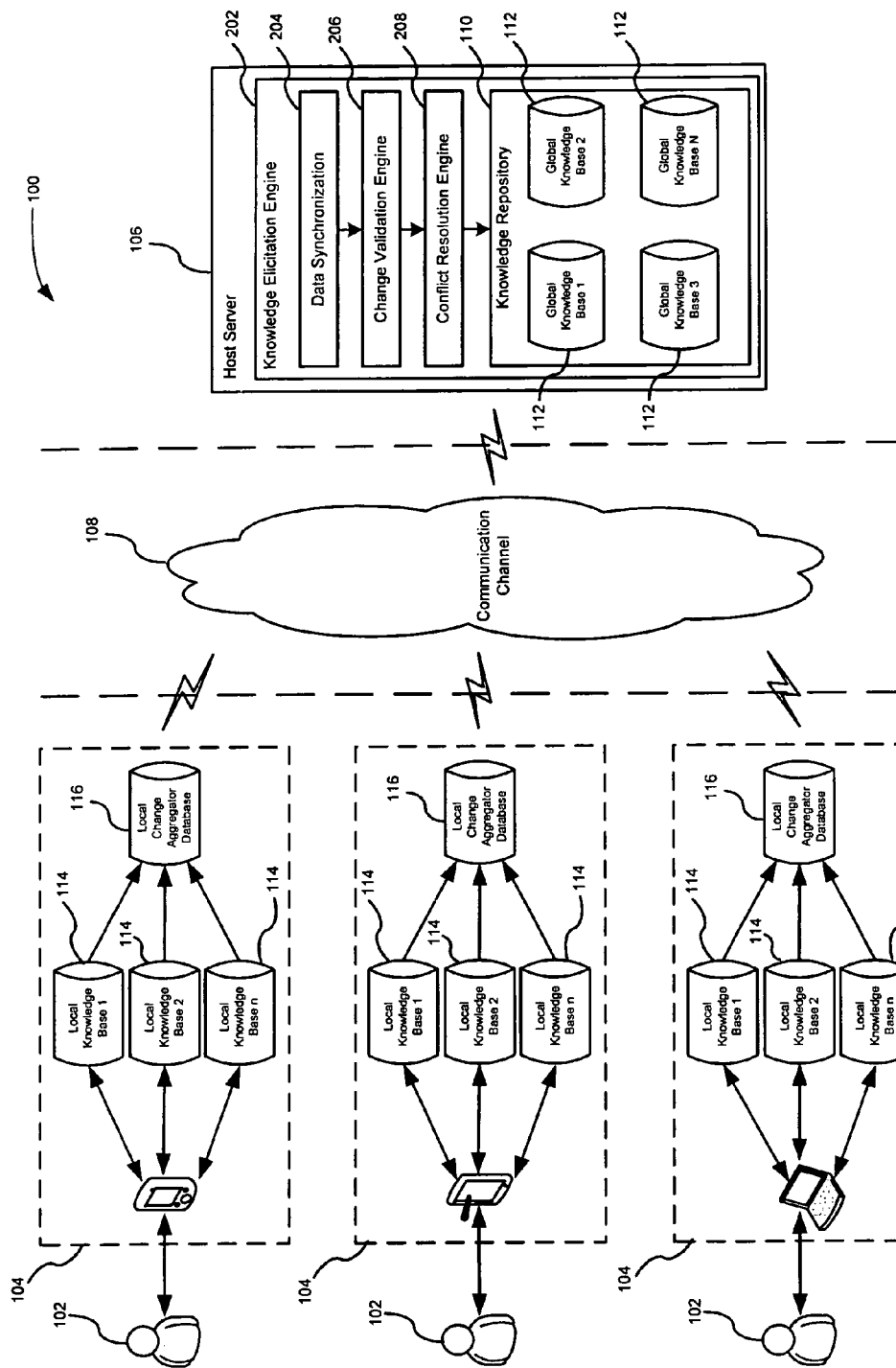
FIG. 1 is a diagram of a distributed knowledge system, according to one implementation.

Referring to FIG. 1, a knowledge system 100 is disclosed that provides a general framework for the migration, synchronization, and aggregation of stored data from multiple and distributed data sources. As illustrated in FIG. 1, the stored data may be accessed and utilized by one or more users 102 of the knowledge system 100. The users 102 may access, modify, or create data on their local devices 104. The knowledge system 100 also allows users 102 to propose changes to data stored in a knowledge repository 110, and through the use of a knowledge elicitation engine 202, the system 100 analyzes whether these proposed changes are valid or not. Depending on the outcome of this analysis, the proposed changes may be integrated into the data stored in the knowledge repository 110 for the benefit of the other users 102 of the system 100.

In one implementation, the local devices 104 may be portable computing devices such as laptop computers, personal digital assistants (PDAs), tablet PCs, or other devices that users may carry with them on field assignments. In other implementations, the local devices 104 may not be portable, but rather stationary computing devices such as dedicated workstations, desktop computers, or the like.

As shown in FIG. 1, the local devices 104 may communicate electronically with a host server 106 through a communication channel 108. The communication channel 108 provides an electronic link between the local devices 104 and the host server 106. A few examples of communication channels 108 include intranet LAN connections, extranet WAN connections, and wired or wireless Internet connections. In some implementations, the communication channel 108 may provide a permanent link, such as a dedicated network connection, between the local devices 104 and the host server 106. In other implementations, the local devices 104 may be intermittently connected to the host server 106. For example, a user 102 may keep the local device 104 disconnected from the host server 106 except when uploading or downloading data.

As illustrated in FIG. 1, the host server 106 of a knowledge system 100 includes a knowledge repository 110 that provides a storage area for knowledge in the knowledge system 100. In one implementation, the knowledge repository 110 may be a file-based system that may store one or more global knowledge bases 112. In other implementations, a database management system may be used to store one or more global knowledge bases 112. Although only a single knowledge repository 110 is illustrated in FIG. 1, the system may be configured to support multiple knowledge repositories that may be distributed across multiple computer devices.

FIG. 1 also shows the main components of a knowledge elicitation engine 202 which may reside on the host server 106. These components include a data synchronization component 204, a change validation engine 206, and a conflict resolution engine 208 in addition to the previously mentioned knowledge repository 110. These components 204, 206, and 208 will be discussed further in association with FIG. 2.

Global knowledge bases 112, which may reside within the knowledge repository 110, aggregate and store information for knowledge retrieval. The global knowledge bases 112 may include a collection of electronic documents such as electronic mail (e-mail messages), web pages, business documents, etc., that may be searched and organized for users 102. In some implementations, global knowledge bases 112 may be organized as a collection of knowledge that may be expressed using various knowledge representation languages. These knowledge representation languages may include logic rules, production rules, semantic networks, structured attributes, unstructured documents, and frames. Although four global knowledge bases 112 are illustrated in FIG. 1, a knowledge repository 110 may be configured to support one or more global knowledge bases 112.

The local devices 104 may store one or more local knowledge bases 114 in memory or on disk. These local knowledge bases 114 may contain fully replicated versions of global knowledge bases 112, or they may contain some subset of the data from the global knowledge bases 112. Due to the extremely large storage space that would usually be required to store the entirety of data contained in a corporate knowledge system 100, it is often advantageous to allow such subsets of the data to be created on the local device 104 based on the types of information the user 102 actually needs to complete tasks that are generally within the user's field. In one implementation, users 102 may be able to pick and choose the types of data they want to be stored on their local devices 104 while connected to the host server 106. In another implementation, the host server 106 may automatically provide information to the local devices 104 based upon a predetermined set of rules relating to the type of user, memory of the local device, geographic area, or other relevant data. Since the local knowledge bases 114 are physically stored locally in memory or on disk, the user 102 of a local device 104 may access the data in the local knowledge bases 114 even while disconnected from the host server 106.

The local knowledge bases 114 may also contain user-specific changes to information in the global knowledge bases 112. For example, while completing a task, a user 102 may find that a procedure contained in the local knowledge base 114 is incorrect or inefficient, and the user 102 may modify the procedure to correct the problem. In some implementations, after finding such a discrepancy between the "correct" method and the procedure stored in the global knowledge base 112, the user 102 may choose to either recommend an update to the information in the global knowledge base 112 or to just make the change on the local device 104 in the local knowledge base 114. For example, the user 102 may determine that a certain procedure contains twelve different steps but realize that, in her experience, she can skip two of the steps and still attain a proper result in less time. In this example, the user 102 may propose a change to the global knowledge base 112 so that other users 102 will also be able to save time in completing the same task. In a different example, another user 102 may determine that he has a particular preference for completing a given task, but he knows that the other method works just as well and is already well-documented. In that case, he may choose to make the change in his local knowledge base 114 but not propose that a change be made to the global knowledge base 112.

As shown in FIG. 1, a local aggregator database 116 may be included in the memory of a local device 104 to store the aforementioned changes to the local knowledge bases 114 or proposed changes to the global knowledge bases 112. In other implementations, the change information may be stored within the local knowledge bases 114 themselves. In such implementations, a local knowledge base 114 may allow flags or other electronic markers to be set to indicate that the change should be recognized or ignored when the local device 104 is connected to the host server 106. In addition to data change information, the local aggregator database 116 or the local knowledge bases 114 may also contain data indicators for when a particular piece of knowledge is accessed or used on a local device 104, and may also allow the user 102 to rate a given piece of knowledge after using it such that the quality or usefulness of that piece of knowledge is identified. These feedback and usage statistics are discussed in greater detail in association with the description of FIGS. 2, 3, and 4.

Figure 2:
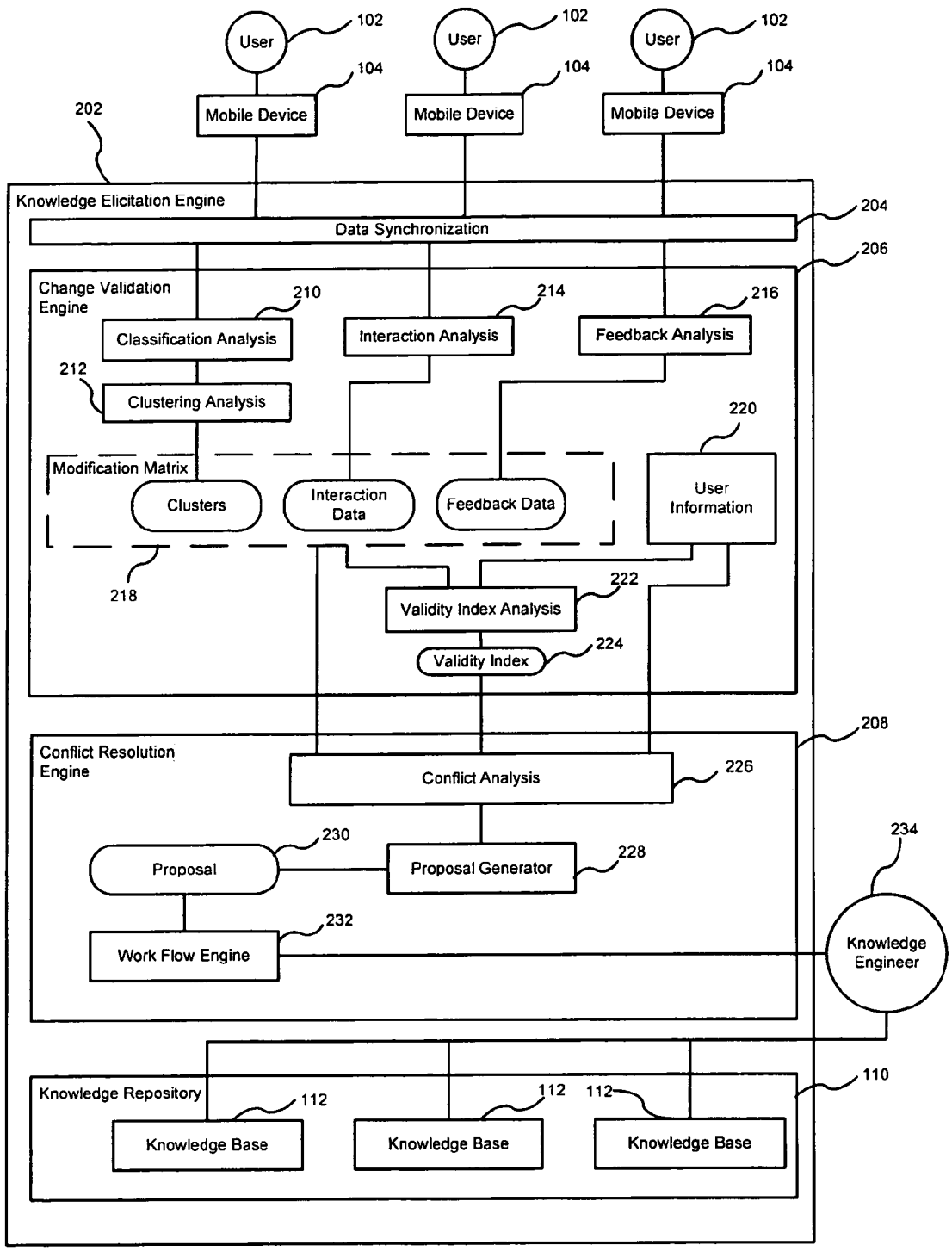
FIG. 2 is a block diagram of various components of the knowledge elicitation engine shown in FIG. 1, according to one implementation.

Referring to FIG. 2, a knowledge elicitation engine 202 that may reside on a host server 106 is disclosed. As illustrated, a knowledge elicitation engine 202 may include components such as a data synchronization component 204, a change validation engine 206, a conflict resolution engine 208, and a knowledge repository 110.

The data synchronization component 204 may be the primary interface between the users' local devices 104 and the knowledge elicitation engine 202. In some implementations, the data synchronization component 204 may act as a buffer between the incoming data and further server processing layers. For example, the data synchronization component 204 may asynchronously accept data updates from local devices 104 and store these various updates until some condition has been met. In some implementations, this condition may be a timer such that every six hours, for example, all of the data from the previous six hours is sent to the next server processing layer as a batch process. In other implementations, the condition may be a size limitation such that the data synchronization component 204 stores updates until a predefined threshold level of, for example, ten gigabytes of information has been received. In yet another implementation, the data synchronization component 204 may merely provide a pass-through interface between the local devices 104 and the knowledge elicitation engine 202, thus allowing for nearly asynchronous processing of incoming messages.

As illustrated in FIG. 2, the next layer of processing in the knowledge elicitation engine 202 is the change validation engine 206. As information is received by the change validation engine 206, it may be categorized and routed into three main groupings: information about a requested change may be routed to a classification analysis component 210 and further to a clustering analysis component 212; information about how a piece of knowledge has been used may be routed to an interaction analysis component 214; and information generated about the quality or usefulness of a piece of knowledge may be routed to a feedback analysis component 216.

Each piece of knowledge that exists in the overall knowledge system 100 may include data from any one or any combination of the three main groupings associated with it. In some implementations, usage statistics may be automatically generated each time a knowledge entity is accessed. In these implementations, change request or feedback data will not exist without usage data also existing about the entity. However, in other implementations, where, for example, usage and feedback data is not automatically generated, the first user 102 of a knowledge entity may notice a mistake and immediately request that the entity be changed. Similarly, assuming usage data is not automatically generated and the users 102 of the knowledge entity have not requested a change, feedback data may exist whereas data from the other groupings may not. The analysis that occurs in each of the aforementioned components 210, 212, 214, and 216 is described in greater detail in association with FIG. 3.

As shown in FIG. 2, the output of the various analysis components may then be grouped together into a modification matrix 218. This modification matrix 218 may contain all of the related information associated with any given singular knowledge entity or a set of knowledge entities. For example, assuming the most basic case of a single knowledge entity, the modification matrix 218 may include information that one step of a procedure should be modified in a given knowledge entity, that the knowledge entity had been used a specified number of times by all of the users 102 in the field, and include each piece of feedback received or an aggregate of the feedback about the specific knowledge entity. In a more complicated example, the matrix may include several different change requests for a single knowledge entity, with the matrix also including the same information about the entity's feedback and usage. In a typical and complex example, the matrix may include information about many different knowledge entities from many different users and also include the associated feedback and usage of each of the different knowledge entities.

Also illustrated in FIG. 2 is a user information component 220. This component is discussed in greater detail in association with FIG. 3. At this level, it is important to note that, in some implementations, the output from the user information component 220, which generates data based on a user proposing a given change to a specific knowledge entity, serves as an input to the validity index analysis component 222.

Another process of the change validation engine 206 shown in FIG. 2 may be performed by the validity index analysis component 222, which may calculate a validity index 224 based on different inputs. In one implementation, the validity index analysis component 222 accepts the entire modification matrix 218 and the data from the user information component 220 both as inputs. In various other implementations, the data represented by the modification matrix 218 may be separately processed or manipulated prior to entering the validity index analysis component 222, or one or more of the pieces of data may not be required as an input. In any of these implementations, the validity index analysis component 222 creates a validity index 224 representing a quantified value of the validity of the proposed change to a knowledge entity. The validity index analysis component 222 is discussed further in association with FIG. 3, and an example of a validity index 224 calculation is shown and discussed in association with FIG. 5.

The change validation engine 206 processing may be succeeded in the overall knowledge elicitation engine 202 by a conflict resolution engine 208. In one implementation, if the validity index 224 meets a given threshold criterion, the conflict resolution engine 208 is automatically triggered. In other implementations, there may be other criteria examined before automatic triggering, such as a timing index. For example, even a proposed change that has been deemed to be otherwise valid by the validity index analysis component 222 may have to remain in a proposal status for a given period of time before the conflict resolution engine 208 is fired. In another implementation, the knowledge elicitation engine 202 may require some manual input before the conflict resolution engine 208 proceeds. While the aforementioned implementations contemplate a conflict resolution engine 208 being an integral part of the overall knowledge elicitation engine 202, some implementations may not require a conflict resolution engine 208. Rather, in these implementations, when a proposed change meets a certain threshold criterion, possibly represented by the validity index 224 being at or above a certain level, the proposed change may automatically proceed to be entered into the global knowledge base 112 in the knowledge repository 110. In other implementations, other processing may occur in addition to or in lieu of the conflict resolution engine 208 processing shown in FIG. 2.

Also shown as part of the knowledge elicitation engine 202 in FIG. 2 is a conflict resolution engine 208. In one particular implementation, a conflict resolution engine 208 may have a conflict analysis component 226, which may determine whether two or more proposed changes contain conflicting information. If a conflict is detected, the conflict resolution engine 208 may pass the conflicting information to a proposal generator component 228, which may generate one or more proposals 230 for which proposed change is "better" based on a dynamically definable rule set. In one implementation, the "best" proposal may be automatically accepted and incorporated into the knowledge entity 302. In other implementations, a proposal 230 may be passed to a work flow engine 232 and/or to a knowledge engineer 234 to determine which proposed change or combination of proposed changes should be incorporated into the knowledge entity 302.

Figure 3:
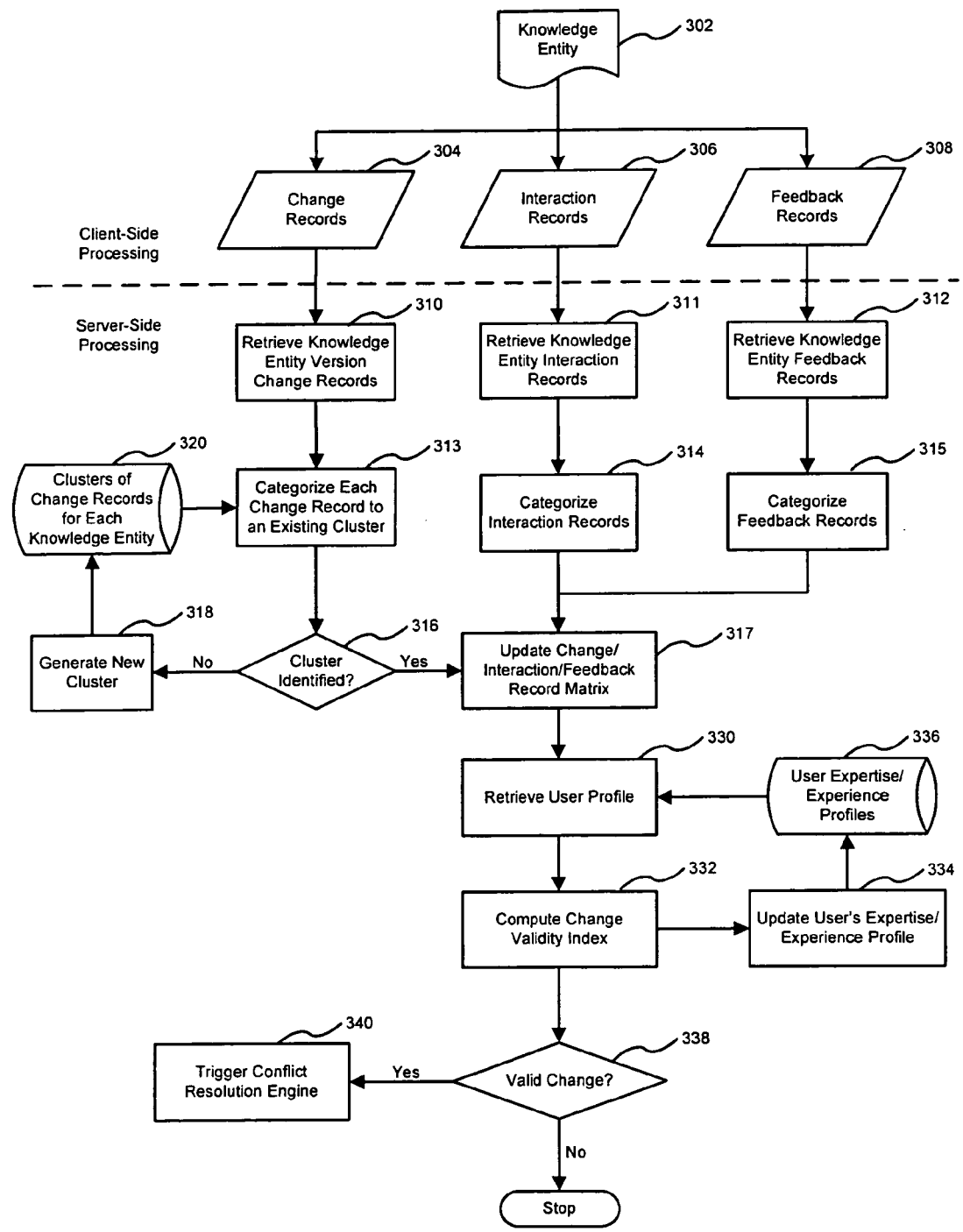
FIG. 3 is a flow diagram of a change validation process, according to one implementation.

FIG. 3 shows a flow diagram detailing how data about a proposed change to a knowledge entity 302 is retrieved from a local device 104 and then proceeds through the change validation engine 206 processing described briefly in association with FIG. 2. As illustrated, the proposed changes to a knowledge entity 302 may begin on a user's local device 104. The process of creating a proposed change on a local device 104 was discussed previously in association with FIG. 1 and is discussed further in association with FIG. 4.

As shown in FIG. 3, any given knowledge entity 302 may have different types of records associated with it including change records 304, interaction records 306, and/or feedback records 308. These different types of records are described more fully in the following paragraphs.

Change records 304 may include the substantive information describing the proposed change itself and may also include certain metadata describing information about the context of the proposed change. For example, the substantive information about the proposed change could include details about the additions, edits, or deletions of certain attributes, text or other information contained with the knowledge entity 302 itself. In contrast, the contextual metadata information may include specific information about the context of the proposed change, such as which user 102 suggested the proposed change, which device 104 the proposed change originated from, or what type of task the user 102 was performing when the change was originated.

Interaction records 306 may be associated with a given knowledge entity 302 and may include information about how each knowledge entity 302 has been used by various users 102 in the field. In one implementation, interaction records 306 may be generated automatically when a user 102 accesses a particular knowledge entity 302 on a local device 104 or when a search result is returned with that particular knowledge entity 302 as one of the hits. In other implementations, interaction records 306 may be manually generated by the user 102. In implementations where different types of interaction records 306 are created, as in the previous example where both search results and uses generate interaction records 306, the records 306 may include metadata information describing what type of interaction created the record, thus allowing the knowledge system 100 to be able to recognize such differences.

Feedback records 308 may also be associated with a given knowledge entity 302 and may include information about how users 102 rate an entity's quality or usefulness. In various implementations, feedback records 308 may be created manually by users 102, may be generated automatically on the local devices 104 or the host server 106, or some combination thereof. As one example, a "good" feedback record 308 may be automatically generated on the local device 104 when a user 102 requests and uses a knowledge entity 302, and as a result of the use is able to complete the task for which the knowledge entity 302 was requested. In a similar example, if the user 102 was not able to complete the task with the first knowledge entity 302 tried, but rather searched for and used another knowledge entity 302 to complete the task, the first knowledge entity 302 may be given a low or moderate feedback rating while the second knowledge entity 302 may be given a higher feedback rating.

The various types of records 304, 306, and 308 may reside on the local device 104 until the local device 104 synchronizes with the host server 106. As illustrated in FIG. 3, the local device 104 is represented by the area above the dotted line in the "Client-Side Processing" section of the figure, and the host server 106 is represented by the area below the dotted line in the "Server-Side Processing" section of the figure. When the user 102 synchs up the local device 104 with the host server 106, all of the records 304, 306, and 308 may be retrieved from the local device 104 onto the host server 106 as shown by the actions 310, 311, and 312 in FIG. 3. Once the synchronization process is complete, the user 102 may either disconnect the local device 104 from the host server 106 or remain connected, and processing of the newly retrieved records 304, 306, and 308 may proceed on the host server 106.

After retrieval of the records 304, 306, and 308, the host server may categorize the records 304, 306, 308 using actions that are associated with the different types of records. Change records 304 may be categorized by a change record categorization action 313, interaction records 306 may be categorized by an interaction record categorization action 314, and feedback records 308 may be categorized by a feedback record categorization action 315. In some implementations, these actions 313, 314, and 315 may be combined into a single action.

In FIG. 3, the interaction record categorization action 314, which corresponds to the interaction analysis component in FIG. 2, and the feedback record categorization action 315, which corresponds to the feedback analysis component in FIG. 2, may group the various incoming records with other interaction records 306 and feedback records 308 respectively that are associated with the same knowledge entity 302. In some implementations, processing may also occur at this stage to assign quantified numerical values to non-numerical enumerations, or vice versa, contained within the interaction and feedback records 306 and 308. For example, if two thousand interaction records 306 are retrieved for a single knowledge entity 302, the interaction record categorization action 314 may assign the usage of that particular knowledge entity 302 to a level of "High." Similarly, if a feedback record 306 is retrieved that assigns a particular knowledge entity's usefulness as "Moderately Useful," the feedback record categorization action 315 may assign the particular feedback a "six out of ten" rating. As will be discussed further with respect to other processes in this figure and also in association with FIG. 5, these assignments may occur later in the processing in other implementations.

Referring again to FIG. 3, the change record categorization action 313, which corresponds to the classification analysis component 210 and the clustering analysis component 212 in FIG. 2, may classify the change records 304 and cluster various proposed changes from the change records 304 together. This action 313 may identify (316) whether or not there are other proposed changes that are similar to the current proposed change and group these like proposed changes together in a cluster. In one implementation, the clustering process may be based on a set of rules that define what types of different parameters and at what levels those parameters must be for a proposed change to be "similar" to another proposed change. In other implementations, the similarity analysis may include a comparison between an attribute tree that describes the particular knowledge entity 302 with a reference attribute tree describing a current cluster. In another implementation, for example one comparing unstructured knowledge content, the similarity analysis may include a comparison between two natural language based documents. In another implementation, the similarity analysis may rely on a combination of any of the aforementioned methods of comparison.

If the similarity analysis shows that a cluster does not currently exist, a new cluster may be generated by a cluster generation action 318 and the new cluster may be stored in a change record clustering database 320. As shown in FIG. 3, this change record clustering database 320 may be polled during the change record categorization action 313 to determine whether any clusters exist.

Once the different change records 304, interaction records 306, and feedback records 308 have been categorized and/or clustered by their respective categorization actions 313, 314, and 315, the records 304, 306, and 308 maybe grouped into a modification matrix 218 as described above in association with FIG. 2. A modification matrix 218 is used to create structure around the otherwise loosely associated records 304, 306, and 308, but different implementations may use different methods of providing structure such as a tree structure hierarchy or other computer implemented structures.

As shown in FIG. 3, a user's profile may be retrieved from storage in a user profile database 336 through a user profile retrieval action 330. This particular action 330 corresponds to the user information component 220 shown in FIG. 2. In one implementation, the user profiles for each user proposing a change through a change record 304 may be retrieved and associated with their respective change records 304 in the modification matrix 218. In some implementations, the user profiles for each user associated with any knowledge entity 302 in any of the records 304, 306, or 308 may be retrieved from the user profile database 336 for use in updating those profiles through a user profile update action 334. For example, if a user 102 had previously modified a knowledge entity 302, and that knowledge entity 302 and in particular the specific update that the user 102 had created received positive feedback, the user's 102 expertise level, generally or associated with that particular technology or product, may be adjusted in the user profile database 336. In other implementations, the user profile information contained in the user profile database 336 may be relatively static, such that the host server 106 processing never updates the user profiles. For example, in such a particular implementation, the update user profile action 334 would not exist, but an administrator or authorized users may be able to make user profile adjustments directly to the user profile database 336.

The validity index computation action 332 corresponds to the validity index analysis component 222 shown in FIG. 2. In different implementations, the validity index computation action 332 may be based on either the information contained in the modification matrix 218, the information contained in a user profile, or a combination of both. Using any of these implementations, the validity index computation action 332 may generate an indication of how valid the proposed change is. This indication may be expressed in the form of a number that may be referred to as the validity index 224. In other implementations, the indication may be a simple binary response, meaning that the proposed change is either valid or it is not valid. As an example of an implementation generating a validity index 224 based strictly on user profile information, if a user 102 has many years of experience and has a high level of expertise, the change validation engine 206 may produce a high value for the validity index 224. As an example of an implementation generating a validity index 224 based strictly on the modification matrix 218 information, if a knowledge entity 302 is considered to be of low importance, and the previous feedback about the knowledge entity 302 has been very bad, then the validity index 224 of a proposed change from any user may be relatively high because any change to an unimportant, bad piece of information may be an improvement. Further, if the inputs from both the modification matrix 218 and the user profile information described in the previous two examples are considered in conjunction with one another, it is very likely that the validity index 224 would be very high.

The validity index computation action 332 may be based on a variety of rule sets, which may be either static or dynamically definable. An exemplary calculation using a basic rule set is shown and discussed in association with FIG. 5.

As illustrated in FIG. 3, after computing the validity index 224, the processing may either end, indicating that the proposed change was not valid, or it may continue if the proposed change is found (338) to be valid. If valid, the proposed change may be passed along to a conflict resolution engine 208 by way of the conflict resolution triggering action 340. In some implementations, if multiple proposed changes to a single knowledge entity 302 are determined to be valid by the change validation engine 206, the proposed changes may be passed to a conflict resolution engine 208 along with their respective validity indexes 224, and the conflict resolution engine 208 may use these indexes 224 in determining which proposed change should be recommended. In other implementations, if the validity index 224 is high enough, the change validation engine 206 may bypass a conflict resolution engine 208 and directly update the knowledge entity 302 in the global knowledge base 112. In still other implementations, the information from the change validation engine 206 may be passed to different processes in the knowledge system 100.

Figure 4:
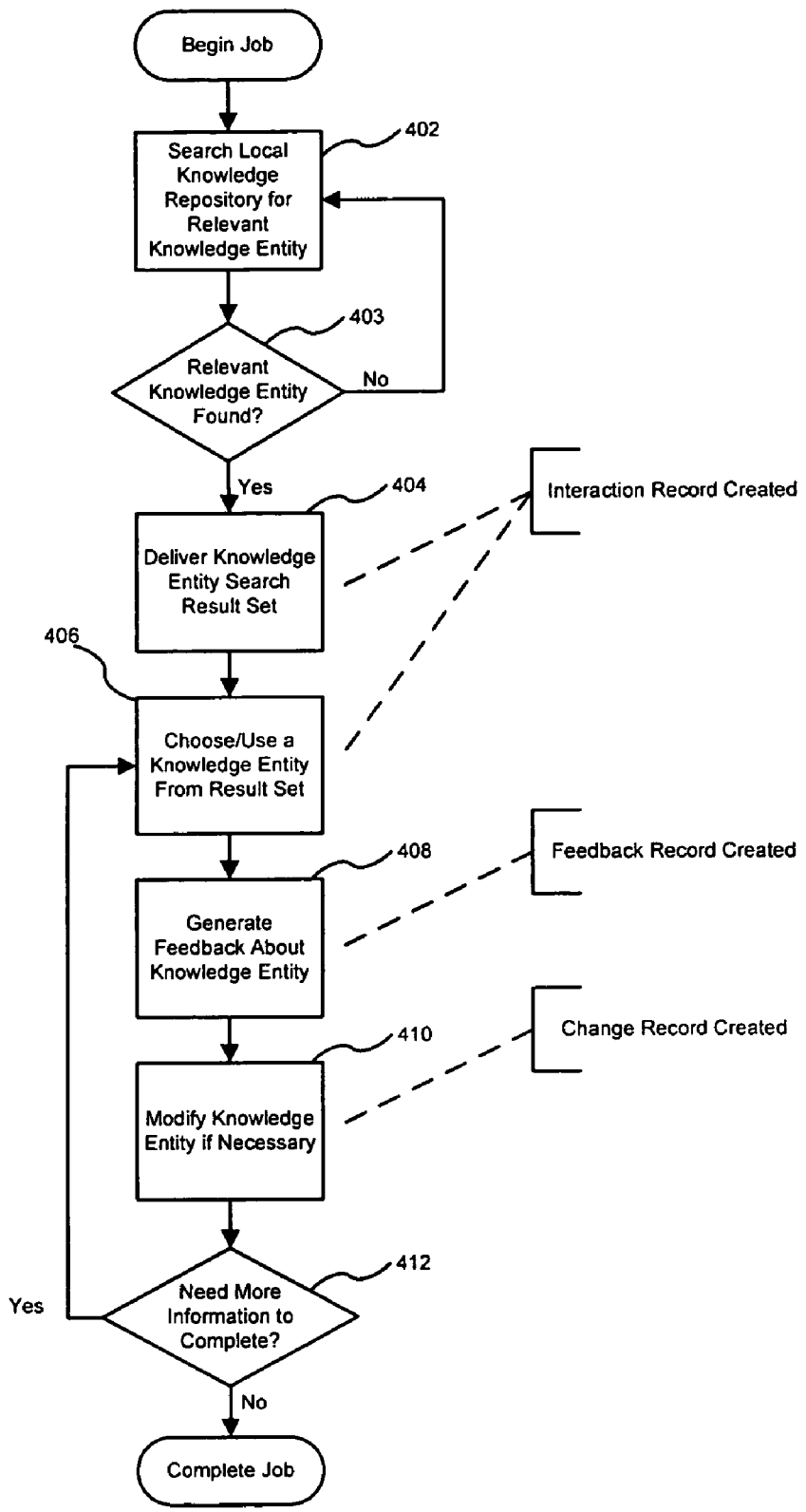
FIG. 4 is a diagram that illustrates a representative process for the use of a knowledge entity, according to one implementation.

FIG. 4 shows how knowledge entities 302 may be utilized by users 102 on their local devices 104. At the initial stage of any task, a user 102 may search (402) the local knowledge bases 114 on the local device 104 for a relevant knowledge entity 302. If no relevant knowledge entities 302 are found (403), the user 102 may search (402) the local knowledge bases 114 again, including different search parameters. If the search (402) process is successful, meaning one or more relevant knowledge entities 302 is found (403), the local device 104 may display (404) the relevant search results to the user 102. In some implementations, the event of a knowledge entity 302 being displayed (404) in a search result set may trigger the creation of an interaction record 306. The user 102 may then choose (406) the knowledge entity 302 that appears to be the most useful for the task. In some implementations, the event of a user 102 choosing (406) a knowledge entity 302 may result in the creation of an interaction record 306 based on actual use.

After using the knowledge entity 302, the user 102 may indicate how useful or relevant the knowledge entity 302 was in accomplishing the particular task. This would result in the generation (408) of a feedback record 308. As previously described, the generation (408) of a feedback record 308 may also be an automatic process within the local device 104.

As illustrated in FIG. 4, the user 102 may also believe that the knowledge entity 302 needs to be modified (410) to improve the information contained within the knowledge entity 302. If this occurs, the user 102 may use the local device 104 to input changes to the knowledge entity 302 locally stored on the user's local device 104. This modification would result in the creation of a change record 304. In some implementations, the user 102 may have to specifically mark the change as a global change rather than a local change in order for a change record 304 to be generated. In other implementations, any change may trigger the creation of a change record 304. If the user 102 then decides (412) that more information is needed to complete a given task, the user 102 may either choose (406) another knowledge entity 302 from the result set or conduct another search (402).

Figure 5:
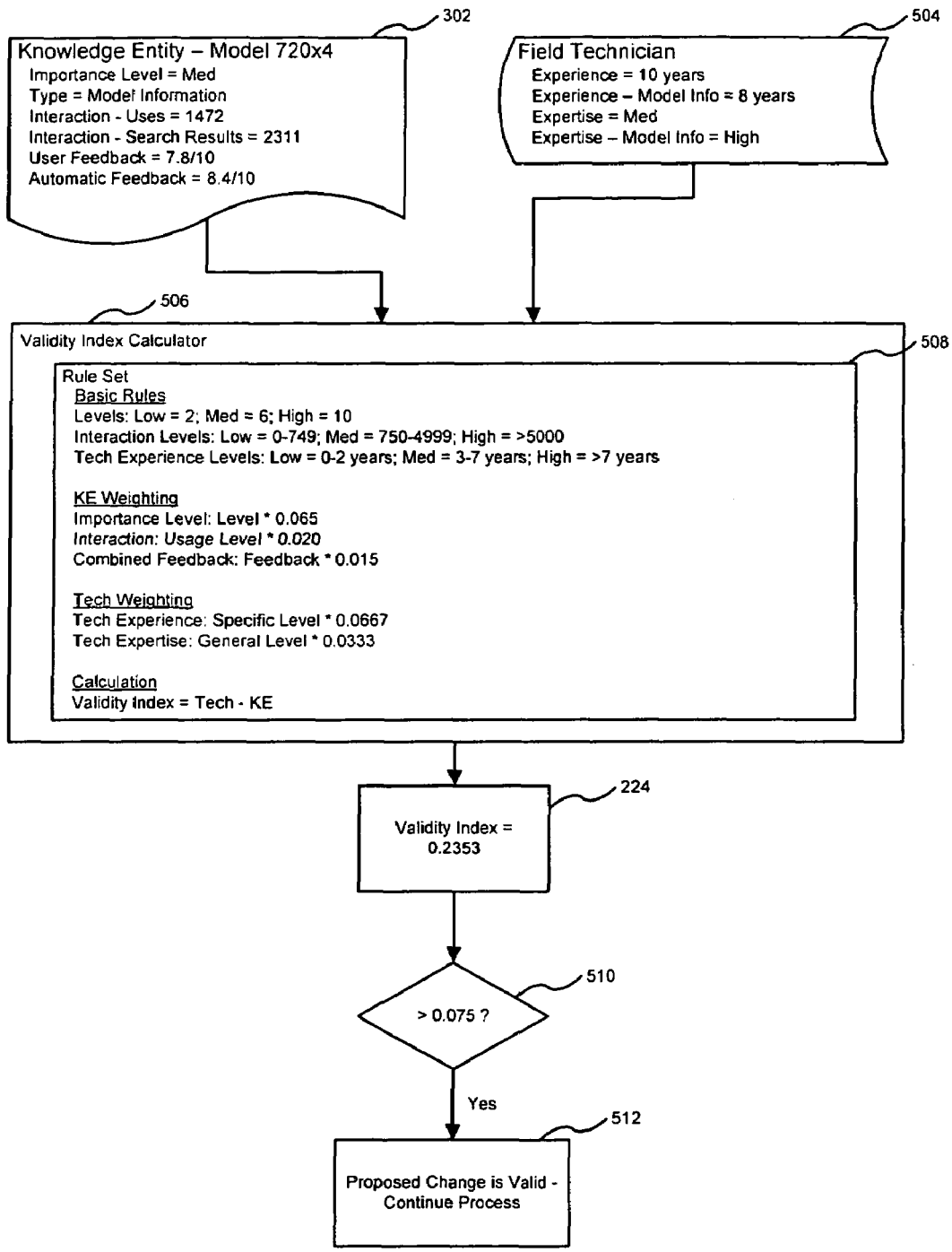
FIG. 5 is a diagram that illustrates a sample validity index calculation, according to one implementation.

FIG. 5 shows a representative example of the information that may be associated with a particular knowledge entity 302 and the information that may be contained in a user profile 504, according to one implementation. As shown, in addition to the proposed substantive changes to the knowledge entity 302, other information in the modification matrix 218 may include the importance, the type, the different possible interaction usage statistics, and the feedback that has been generated with respect to that particular knowledge entity 302. For example, the knowledge entity 302 shown in FIG. 5 describes model information for a "720×4" model of product, which is an entity 302 of "Med" importance that has been used "1472" times and has been returned in a search result set "2311" times. As shown, the example knowledge entity 302 has been rated by users 102 as being "7.8/10" in terms of the entity's usefulness, and the system 100 has automatically rated the entity's usefulness as "8.4/10."

The user profile 504 shown is associated with the user 102 that proposed a change to the specific knowledge entity 302. As illustrated, the user profile 504 may include such information as the user's general experience in terms of years, the user's specific experience in working in the area associated with the user's proposed change, the user's general expertise level, and the user's specific expertise level in working in the area associated with the user's proposed change. In the example shown, the particular user 102 is a field technician with ten years of general experience and eight years of specific experience related to "Model 720×4" products. The exemplary field technician also has a general expertise level of "Med" and a specific expertise level of "High."

As shown in FIG. 5, both the information about the knowledge entity 302 and the user profile 504 may be fed as inputs to the validity index calculator 506. As previously described, the validity index calculator may rely on either a static or a dynamically definable rule set 508 to perform the calculation of the validity index 224. In this particular implementation, the rule set 508 defines some basic rules, such as the quantification of certain enumerations (e.g. "Low"=2), the classification of certain usage levels based on the number of uses (e.g. if a knowledge entity 302 was used more than seven hundred forty-nine times and less than five thousand times, as described by the interaction records 306 associated with that particular knowledge entity 302, the interaction level is considered "Med"), and also the classification of certain experience levels based on the data in the user profile 504 representing the number of years the user 102 had worked. The rule set 508 may also define certain weights to assign to the different types of information relied on for the calculation.

In this particular example, the knowledge entity 302 weighting is based on a maximum value of one where the importance level of the entity 302 is given a sixty-five percent weight, the interaction level of the entity 302 is given a twenty percent weight, and the feedback of the entity 302 is given a fifteen percent weight, thus resulting in a value of 0.6315 (i.e. Importance=0.065*6=0.39; Interaction=0.020*6=0.12; and Feedback=0.015*[(7.8+8.4)/2]=0.1215). Also in this particular example, the user profile 504 weighting is based on a maximum value of one where the user's specific experience level is weighted as two-thirds of the maximum result and the user's general expertise level is weighted as the other one-third, thus resulting in a value of 0.8668 (i.e. Specific Experience=0.0667*10=0.667; General Expertise=0.0333*6=0.1998).

The rule set 508 may also contain the formula for calculating the validity index 224 based on the data inputs that are received. In this particular example, the validity index is calculated by subtracting the value of the knowledge entity 302 from the value of the user 102, thus resulting in a validity index 224 of 0.2353. The validity index 224 is then compared (510) to a threshold criterion, in this example 0.075, and if the validity index 224 is greater than the threshold criterion, as it is in this case, processing continues (512).

Figure 6:
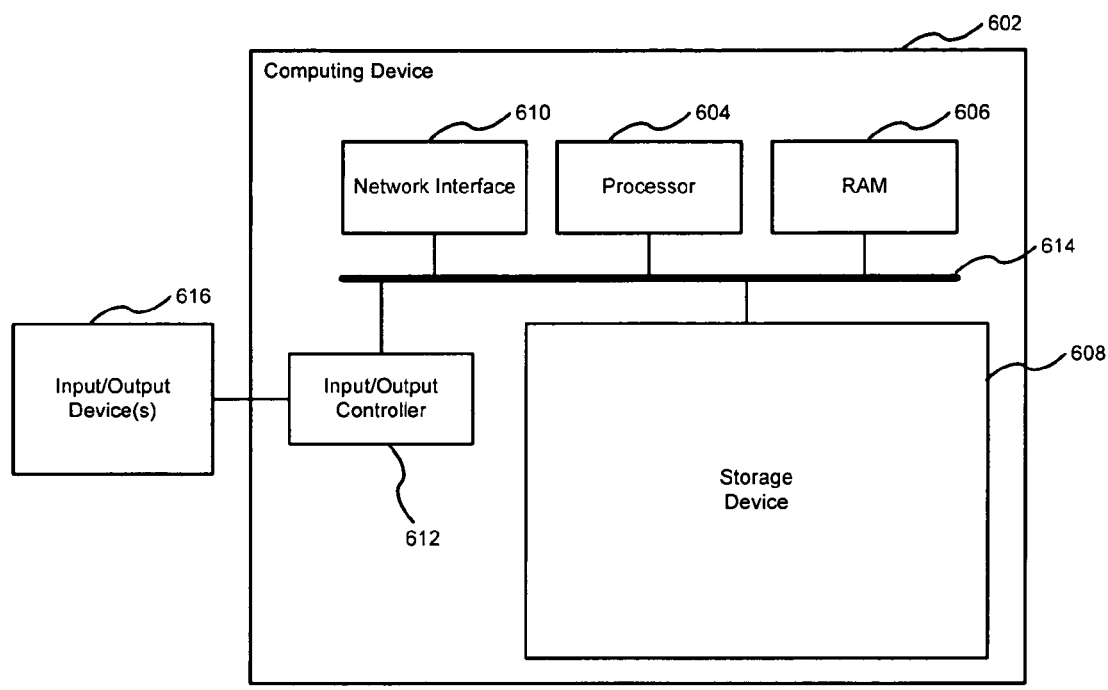
FIG. 6 is a block diagram of a computing device that may be incorporated within the mobile devices or host server shown in FIG. 1.

FIG. 6 illustrates a computing device 602 that may be included within the local devices 104 or the host server 106 shown in FIG. 1, according to one implementation. The computing device 602 includes a processor 604, a memory 606, a storage device 608, a network interface 610, and an input/output controller 612. Each of the components 604, 606, 608, 610, and 612 are interconnected using a system bus 614.

The processor 604 is capable of processing instructions for execution within the computing device 602. In one implementation, the processor 604 is a single-threaded processor. The processor 604 is capable of processing instructions stored in the memory 606 or on the storage device 608 to display graphical information for a graphical user interface (GUI) on an input/output device 616 that is controlled by the input/output controller 612.

The memory 606 stores information within the computing device 602. In one implementation, the memory 606 is a computer-readable medium. In one implementation, the memory 606 is a volatile memory unit. In another implementation, the memory 606 is a non-volatile memory unit.

The storage device 608 is capable of providing mass storage for the computing device 602. In one implementation, the storage device 608 is a computer-readable medium. In various different implementations, the storage device 608 may be a floppy disk device, a hard disk device, an optical disk device, or a tape device.

The network interface 610 is capable of connecting the computing device 602 to a network. In one implementation, the network interface 610 may require physical connection of the computing device 602 to a network connection. In other implementations, the network interface 610 may be capable of wireless network access.

In one implementation, a computer program product is tangibly embodied in an information carrier. The computer program product contains instructions that, when executed, perform one or more methods, such as those described above. The information carrier is a computer- or machine-readable medium, such as the memory 606, the storage device 608, or a propagated signal.

An input/output device 616 may provide input/output operations for the computing device 602. In one implementation, the input/output device 616 includes a keyboard and/or a pointing device. In one implementation, the input/output device 616 includes a display unit for displaying various GUI's such that a human operator may interact efficiently with the computing device 602.

A number of implementations have been described. Nevertheless, it will be understood that various modifications may be made and that other implementations are within the scope of the following claims.

What is claimed is:

1. A method comprising:
    retrieving data corresponding to a knowledge entity within a knowledge repository, the knowledge entity comprising change records, interaction records, and feedback records, the change records including substantive information describing a proposed change and metadata describing information about a context of the proposed change, the interaction records characterizing how the knowledge entity has been used by various users, the feedback records including information about how users rate the knowledge entity's quality or usefulness;
    categorizing the change records by a change record categorization action to categorize each change record to an existing cluster of change records;
    categorizing the interaction records by an interaction record categorization action;
    categorizing the feedback records by a feedback record categorization action;
    grouping the categorized change, interaction, and feedback records into a modification matrix;
    retrieving a user profile from a user profile database for a user requesting the proposed change, the user profile characterizing an expertise level for the user based on historical feedback for the user in connection with historical changes to knowledge entities;
    calculating a validity index for the proposed change based on a definable rule set and using the modification matrix and the retrieved user profile, the definable rule set having inputs including a plurality of quantified values representing contextual information metadata about the proposed change and information about a user proposing the change, the calculated validity index determined using a weighting of an importance level of the knowledge entity, an interaction level representing a frequency of use of the knowledge entity, and the expertise level for the user; and
    deciding, based on the calculated validity index, whether to proceed further in applying the proposed change to the knowledge entity, the deciding comprising:
        triggering conflict resolution if the validity index exceeds a predetermined level;
        providing a proposal to resolve the conflict to a workflow engine; and
        updating the knowledge repository with the proposed change if the workflow engine determines that the knowledge repository should be updated based on the proposal.

2. The method of claim 1, wherein the contextual information about the proposed change further includes a quantifiable representation of either usage of the entity or a feedback rating of the entity, or some combination thereof.

3. The method of claim 1, wherein the method further comprises:
    prior to calculating the validity index, analyzing the proposed change for similarity to other proposed changes from either the same user or from users of other external devices, and grouping similar proposed changes within clusters of like proposed changes.

4. The method of claim 1, wherein the quantifiable data representing the skill level of the user is quantified with respect to either the user's overall skill level or the user's skill level specifically relating to the proposed change, or some combination thereof.

5. The method of claim 1, wherein the method further comprises: prior to calculating the validity index, retrieving stored information about the user's skill level, and updating the stored information about the user's skill level as the user's skill level changes.

6. A computer program product tangibly embodied in computer readable storage media, the computer program product including instructions that, when executed, perform a method to analyze a proposed change to information in an electronic entity, the method comprising:
  retrieving data corresponding to a knowledge entity within a knowledge repository, the knowledge entity comprising change records, interaction records, and feedback records, the change records including substantive information describing a proposed change and metadata describing information about a context of the proposed change, the interaction records characterizing how the knowledge entity has been used by various users, the feedback records including information about how users rate the knowledge entity's quality or usefulness;
  categorizing the change records by a change record categorization action to categorize each change record to an existing cluster of change records;
  categorizing the interaction records by an interaction record categorization action;
  categorizing the feedback records by a feedback record categorization action;
  grouping the categorized change, interaction, and feedback records into a modification matrix;
  retrieving a user profile from a user profile database for a user requesting the proposed change, the user profile characterizing an expertise level for the user based on historical feedback for the user in connection with historical changes to knowledge entities;
  calculating a validity index for the proposed change based on a definable rule set and using the modification matrix and the retrieved user profile, the definable rule set having inputs including a plurality of quantified values representing contextual information metadata about the proposed change, at least one of the inputs comprising a modification matrix characterizing a set of knowledge entities, the calculated validity index determined using a weighting of an importance level of the knowledge entity, an interaction level representing a frequency of use of the knowledge entity, and the expertise level for the user; and
  deciding, based on the calculated validity index, whether to proceed further in applying the proposed change to the electronic entity, the deciding comprising:
    triggering conflict resolution if the validity index exceeds a predetermined level;
    providing a proposal to resolve the conflict to a workflow engine; and
    updating the knowledge repository with the proposed change if the workflow engine determines that the knowledge repository should be updated based on the proposal.

7. The computer program product of claim 6, wherein the contextual information about the proposed change further includes a quantifiable representation of either usage of the entity or a feedback rating of the entity, or some combination thereof.

8. The computer program product of claim 7, wherein the feedback rating of the entity is automatically generated based on a quantifiable representation of the quality of the entity, the quality of the entity being based on the manner in which the entity has been used by the external devices.

9. The computer program product of claim 6, wherein the information about the user proposing the change includes a quantifiable representation of a skill level of the user.

10. The computer program product of claim 9, wherein the skill level includes quantifiable representations of either the user's experience or the user's expertise, or some combination thereof.

11. The computer program product of claim 9, wherein the quantifiable data representing the skill level of the user is quantified with respect to either the user's overall skill level or the user's skill level specifically relating to the proposed change, or some combination thereof.

12. The computer program product of claim 9, wherein the method further comprises:
  prior to calculating the validity index, retrieving stored information about the user's skill level, and
  updating the stored information about the user's skill level as the user's skill level changes.

13. The computer program product of claim 6, wherein the decision to proceed further in a change control process is automated, the change control process continuing only if the validity index meets a definable threshold criterion.

14. The computer program product of claim 6, wherein the method further comprises:
  prior to calculating the validity index, analyzing the proposed change for similarity to other proposed changes from either the same user or from users of other external devices, and grouping similar proposed changes within clusters of like proposed changes.

15. An apparatus comprising:
  a processor; and
  at least one memory, the processor and the at least one memory configured to provide a method comprising;
  retrieving data corresponding to a knowledge entity within a knowledge repository, the knowledge entity comprising change records, interaction records, and feedback records, the change records including substantive information describing a proposed change and metadata describing information about a context of the proposed change, the interaction records characterizing how the knowledge entity has been used by various users, the feedback records including information about how users rate the knowledge entity's quality or usefulness;
  categorizing the change records by a change record categorization action to categorize each change record to an existing cluster of change records;
  categorizing the interaction records by an interaction record categorization action;
  categorizing the feedback records by a feedback record categorization action;
  grouping the categorized change, interaction, and feedback records into a modification matrix;
  retrieving a user profile from a user profile database for a user requesting the proposed change, the user profile characterizing an expertise level for the user based on historical feedback for the user in connection with historical changes to knowledge entities;
  calculating a validity index for the proposed change based on a definable rule set and using the modification matrix and the retrieved user profile, the definable rule set having inputs including a plurality of quantified values representing contextual information metadata about the proposed change and information about a user proposing the change, the calculated validity index determined using a weighting of an importance level of the knowledge entity, an interaction level representing a frequency of use of the knowledge entity, and the expertise level for the user; and deciding, based on the calculated validity index, whether to proceed further in applying the proposed change to the knowledge entity, the deciding comprising:

triggering conflict resolution if the validity index exceeds a predetermined level;

providing a proposal to resolve the conflict to a workflow engine; and updating the knowledge repository with the proposed change if the workflow engine determines that the knowledge repository should be undated based on the proposal.

* * * * *

UNITED STATES PATENT AND TRADEMARK OFFICE
CERTIFICATE OF CORRECTION

PATENT NO. : 7,577,649 B2  
APPLICATION NO. : 10/897827  
DATED : August 18, 2009  
INVENTOR(S) : Wu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Seventh Day of September, 2010

David J. Kappos
*Director of the United States Patent and Trademark Office*